(12) United States Patent
Hirooka et al.

(10) Patent No.: US 7,500,712 B2
(45) Date of Patent: Mar. 10, 2009

(54) VEHICLE DOOR STRUCTURE

(75) Inventors: Kenichi Hirooka, Yokohama (JP);
Kazutoshi Mizuno, Kanagawa (JP);
Motoshi Takahashi, Isehara (JP);
Kousuke Ono, Fujisawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/061,371

(22) Filed: Apr. 2, 2008

(65) Prior Publication Data
US 2008/0303306 A1 Dec. 11, 2008

(30) Foreign Application Priority Data
Jun. 8, 2007 (JP) ............................. 2007-152334
Dec. 21, 2007 (JP) ............................. 2007-329775

(51) Int. Cl.
*B60J 7/00* (2006.01)
(52) U.S. Cl. ................. 296/146.6; 296/187.12
(58) Field of Classification Search ............. 296/146.6, 296/187.12
See application file for complete search history.

(56) References Cited

U.S. PATENT DOCUMENTS
2002/0014787 A1* 2/2002 Yamamoto ................... 296/188

FOREIGN PATENT DOCUMENTS
| DE | 3310961 | 12/1983 |
| DE | 10164345 | 3/2003 |
| DE | 102004022826 | 12/2005 |
| DE | 202005017077 | 3/2007 |
| EP | 1721768 | 11/2006 |
| EP | 1745958 | 1/2007 |
| FR | 2893543 | 5/2007 |

OTHER PUBLICATIONS

European Search Report dated Feb. 21, 2008 (9 pages).

* cited by examiner

*Primary Examiner*—Joseph D Pape
(74) *Attorney, Agent, or Firm*—Osha • Liang LLP

(57) ABSTRACT

A vehicle door structure includes a reinforcing member extending along an inner side of an outer door panel in a longitudinal direction, wherein the reinforcing member includes an extrusion-molded body, a forward end surface and a rear end surface, each comprising fixing portions configured to abut forward and rear mounts upon the inner side of the outer door panel, and the reinforcing member configured to be secured to the mounts in the longitudinal direction.

16 Claims, 3 Drawing Sheets

VEHICLE DOOR STRUCTURE

CROSS-REFERENCE TO RELATED APPLICATIONS

The present application claims priority from Japanese Patent Application No. 2007-152334, filed Jun. 8, 2007 and Japanese Patent Application No. 2007-329775, filed Dec. 21, 2007. The contents of both priority Applications are hereby incorporated by reference in their entirety.

BACKGROUND OF THE DISCLOSURE

1. Field of the Disclosure

Embodiments of the present disclosure relate to vehicle door structures. More particularly, the present disclosure relates to a vehicle door structure providing reinforcement of an inner side of a door to enhance rigidity of the door.

2. Description of Prior Related Art

Japanese Unexamined Patent Application Publication No. 5-116537 (e.g., paragraphs 0010 to 0021 and FIG. 1) discloses an example of a vehicle door structure in which an inside sealing member is formed together with corner pieces located at the front and rear of the inside sealing member and with a rear molded portion of a door weather strip by integral molding.

In such a vehicle door structure, inner door panels of door bodies located at the side surfaces of the vehicle are provided with press-molded outer panel members at the outer sides thereof and vehicle door trim members at the inner sides thereof.

Each of these vehicle door trim members is a laminate mainly constituted by a core material and an outer layer backed with a foam layer.

Each inner door panel and the corresponding press-molded outer panel member are joined together along their edges so as to form a box shape with a closed cross section.

In the vehicle door structure described above, the inner door panel and the press-molded outer panel member are joined together along their edges to form a box shape with a closed cross section to achieve a desired rigidity.

Another example of a vehicle door structure is disclosed in Japanese Unexamined Utility Model Registration Application Publication No. 6-78036 (e.g., paragraphs 0012 to 0025 and FIGS. 1 and 2) in which a hollow waist garnish member formed of a synthetic resin molded body is provided within a door trim.

However, in the vehicle door structure described above, the inner door panel of the door body includes several tabbed-end portions in the front-to-rear direction of the vehicle, which must be joined to the outer door panel. As a result, there are numerous possible mounting positions such that a high degree of precision is difficult to achieve in mounting such inner door panels. Additionally, such tabbed structure makes it difficult to maintain structural rigidity in the inner door panels.

SUMMARY OF THE CLAIMED SUBJECT MATTER

In one aspect, the present disclosure relates to a structure for a vehicle door including a reinforcing member extending along an inner side of an outer door panel in a longitudinal direction, wherein the reinforcing member includes an extrusion-molded body, a forward end surface and a rear end surface, each comprising fixing portions configured to abut forward and rear mounts upon the inner side of the outer door panel, and the reinforcing member configured to be secured to the mounts in the longitudinal direction.

In another aspect, the present disclosure relates to a method to construct a vehicle door structure including extruding a reinforcing member along a longitudinal direction, locating the extruded reinforcing member between mounts affixed to an inner side of an outer door panel, wherein the mounts are configured to abut fixing portions located at a forward end and a rear end of the reinforcing member, securing the reinforcing member to the mounts with bolts extending into bolt holes of the fixing portions, and contemporaneously forming the bolt holes with the extrusion of the reinforcing member.

In another aspect, the present disclosure relates to a structure for a vehicle door including a reinforcing means extending along an inner side of an outer door panel in a longitudinal direction of a vehicle, the reinforcing means including a body, and a forward end surface and a rear end surface, each comprising a fixing means, the fixing means configured to abut forward and rear mounting means of the inner side of the outer door panel, the reinforcing means configured to be secured to the mounting means in the longitudinal direction.

BRIEF DESCRIPTION OF DRAWINGS

Features of the present disclosure will become more apparent from the following description in conjunction with the accompanying drawings.

DETAILED DESCRIPTION

A vehicle door structure according to an embodiment of the present disclosure will now be described with reference to FIGS. 1 to 3.

Figure 1:
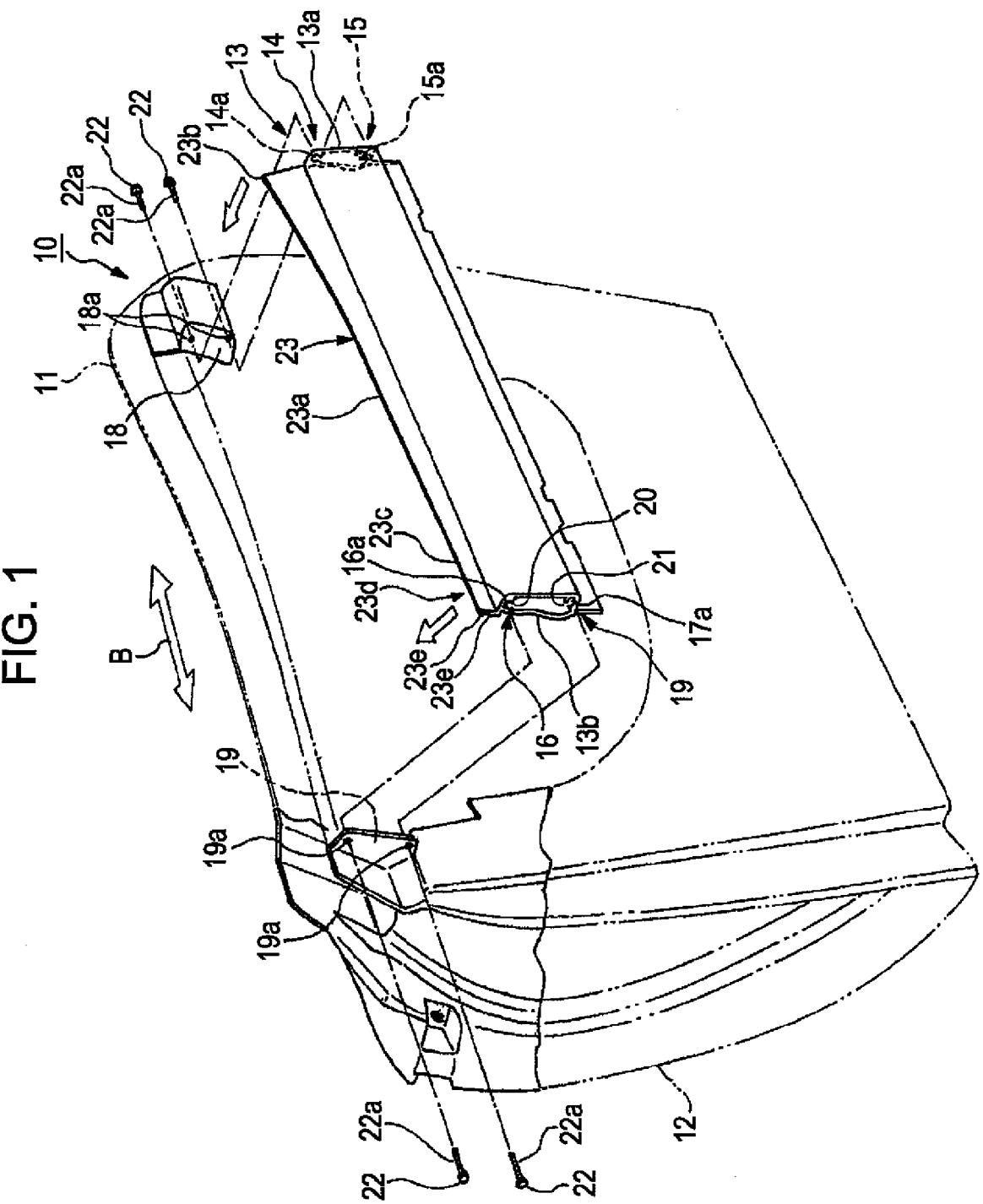
FIG. 1 is an exploded perspective view of a door body of a vehicle illustrating an overall configuration of a vehicle door structure in accordance with embodiments of the present disclosure
Figure 2:
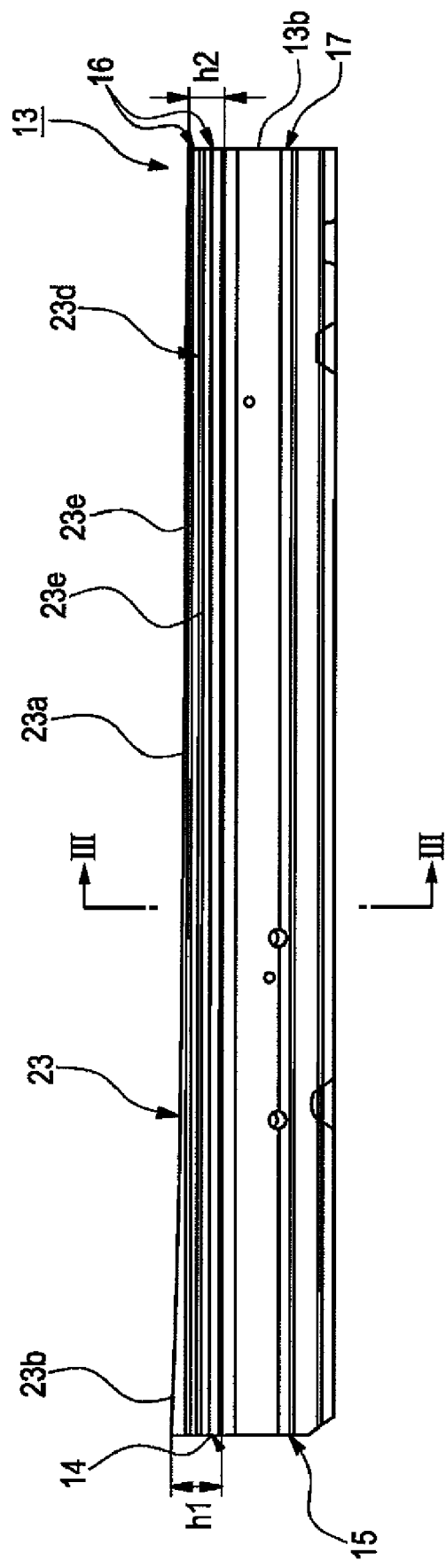
FIG. 2 is a side view of an inner door reinforcing member in accordance with embodiments of the present disclosure.

Referring initially to FIG. 1, a vehicle front door 10 is provided as a vehicle door that is pivotable with respect to a vehicle body of a vehicle. As shown, front door 10 comprises an inner-door reinforcement member 13 extending in a front-to-rear longitudinal direction B of the vehicle along an inner side of an outer door panel 12 of a vehicle door body 11.

In selected embodiments, reinforcing member 13 may be constructed by cutting an extrusion-molded aluminum body to a desired length. Referring to FIG. 3, the extrusion-molded member having a substantially ring-shaped closed cross-section may be formed by extruding aluminum longitudinally into a substantially hollow tubular body. Thus, a substantially hollow tubular body comprising a uniform vertical cross-section along its entire length may be formed. In other embodiments, reinforcing member may be cast or machined.

As shown, reinforcing member 13 may comprise a front end surface 13a and a rear end surface 13b cut substantially at 90° (i.e., orthogonally) to longitudinal direction B. Front end surface 13a may include upper and lower mounts 14 and 15, and rear end surface 13b may include upper and lower mounts 16 and 17. Mounts 14, 15, 16, and 17 may serve as fixation portions and may be provided with respective bolt holes 14a, 15a, 16a, and 17a.

In selected embodiments, bolt holes 14a, 15a, 16a, and 17a may be formed in the course of the extrusion-molding process such that bolt holes 14a and 16a communicate with each other and bolt holes 15a and 17a communicate with each other in longitudinal direction B of reinforcing member 13.

Figure 3:
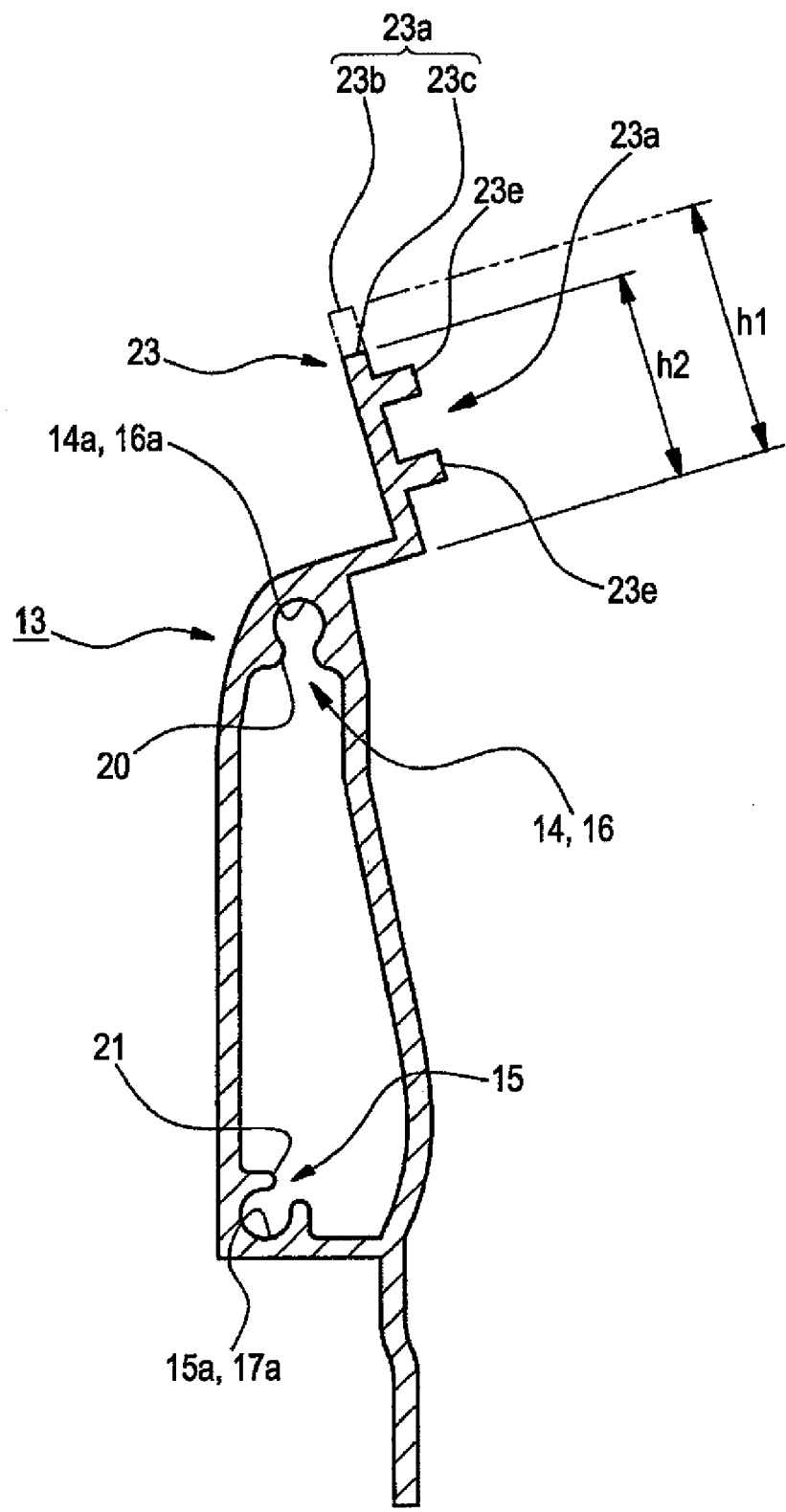
FIG. 3 is a cross-sectional view of the inner-door reinforcing member of FIG. 2 taken along line III-III.

As shown in cross-sectional FIG. 3, an inner wall extending between bolt holes 14a and 16a may be partially provided with a gap 20. Specifically, gap 20 may be formed by partially cutting out the periphery of bolt holes 14a and 16a in longitudinal direction B and may be provided to permit diametric expansion of bolt holes 14a and 16a. Similarly, an inner wall extending between bolt holes 15a and 17a may be partially provided with a gap 21. Gap 21 may be formed by partially cutting out the periphery of bolt holes 15a and 17a in longitudinal direction B and may be provided to permit diametric expansion of bolt holes 15a and 17a.

Outer door panel 12 of door body 11 may be provided with corresponding reinforcement mounting-surface sections 18 and 19 serving as mounting portions for reinforcing member 13. Reinforcement mounting-surface section 18 may include a pair of upper and lower mounting holes 18a and 18a and reinforcement mounting-surface section 19 may similarly include a pair of upper and lower mounting holes 19a and 19a.

Upper mounting holes 18a and 19a may be configured to receive bolts 22 from the front and rear-facing directions of the vehicle so that bolts 22 face each other. Similarly, lower mounting holes 18b and 19b may also receive bolts 22 from the front and rear-facing directions of the vehicle so that bolts 22 face each other.

Consequently, as shown in FIG. 1, the inserting direction of shafts 22a of bolts 22 protruding from reinforcement mounting-surface section 18 of door body 11 may be aligned with the extending direction of the bolt holes 14a and 15a parallel to longitudinal direction B of reinforcing member 13. Likewise, the inserting direction of shafts 22a of another pair of bolts 22 protruding from reinforcement mounting-surface section 19 of door body 11 may be aligned with the extending direction of bolt holes 16a and 17a parallel to longitudinal direction B of reinforcing member 13.

By inserting and fastening bolts 22 to the inner surfaces of bolt holes 14a, 15a, 16a, and 17a, front and rear end surfaces 13a and 13b of reinforcing member 13 may be securely bolted to reinforcement mounting-surface sections 18 and 19 of door body 11.

Further, reinforcing member 13 may be provided with an integral flange 23 projecting outward from an upper side thereof. Flange 23 may have an upper edge 23a cut into a shape that conforms to the contour of door body 11 and a door trim member (not shown). Referring to FIGS. 2 and 3, upper edge 23a may comprise an front upper portion 23b located toward the front of the vehicle and a rear upper portion 23c located toward the rear of the vehicle. Front upper portion 23b may be characterized by a height h1 that is greater than a corresponding height h2 of rear upper portion 23c.

Flange 23 may further comprise a surface 23d facing a liftable glass member (not shown). Surface 23d may be provided with a pair of integral sealing-lip protrusions 23e. Sealing-lip protrusions may be formed through extrusion molding.

In selected embodiments, a cutting process for upper edge 23a (from front portion 23b to rear portion 23c) of flange 23 may be performed after reinforcing member 13 is constructed using the extrusion molding process. This allows upper edge 23a to extend smoothly from front upper portion 23b to rear upper portion 23c in conformity to the contour of door body 11.

As shown in FIG. 1, in selected embodiments, reinforcing member 13 is positioned so as to be sandwiched between reinforcement mounting-surface sections 18 and 19 from the front and rear sides of the vehicle while upper and lower mounts 14, 15, 16, and 17 provided at front and rear end surfaces 13a and 13b of reinforcing member 13 are disposed facing reinforcement mounting-surface sections 18 and 19 of door body 11.

Then, bolts 22 are respectively inserted into mounting holes 18a and 19a of reinforcement mounting-surface sections 18 and 19 so as to face each other from the front and rear directions of the vehicle.

Subsequently, shafts 22a of the pair of bolts 22 protruding from reinforcement mounting-surface section 18 and shafts 22a of another pair of bolts 22 protruding from reinforcement mounting-surface section 19 are inserted and fastened to corresponding bolt holes 14a, 15a, 16a, and 17a of reinforcing member 13.

According to selected embodiments, reinforcement member 13 may be an aluminum extrusion-molded body having a uniform closed ring-shaped vertical cross-section in a longitudinal direction. Specifically, reinforcing member 13 may have a substantially hollow tubular shape that is dimensionally constant along substantially the entire length extending between front end surface 13a and rear end surface 13b that is fixed to reinforcement mounting-surface sections 18 and 19 of door body 11.

Advantages of the vehicle door structure according to selected embodiments will now be described.

Accordingly, unlike the related art where the tabbed bolt mounting surfaces have the possibility deteriorating rigidity in a bending direction, selected embodiments prevent such deterioration by maintaining rigidity of reinforcing member 13.

In addition, reinforcing member 13 may be mounted on door body 11 by fixing front end surface 13a and rear end surface 13b of the inner door reinforcing member 13 onto reinforcement mounting-surface sections 18 and 19 using a pair of bolts 22 and another pair of bolts 22. Consequently, this can enhance the rigidity of the door body 11.

Moreover, front and rear end surfaces 13a and 13b of reinforcing member 13 may be sandwiched between reinforcement mounting-surface sections 18 and 19 from the front and rear sides of the vehicle while upper and lower mounts 14, 15, 16, and 17 are disposed in contact with and facing reinforcement mounting-surface sections 18 and 19 of door body 11.

Consequently, because reinforcing member 13 may securely be positioned in longitudinal B (i.e., front-to-rear) direction of the vehicle, additional installation jigs, and other installation tooling and fixtures, are not necessary.

Additionally, as a result of bolt holes 14a, 15a, 16a, and 17a being provided in their respective upper and lower mounts 14, 15, 16, and 17 to serve as fixing locations, additional mounting components for reinforcing member 13 are not necessary. By simply inserting and fastening bolts 22 to their corresponding bolt holes, reinforcing member 13 may be fixed to reinforcement mounting-surface sections 18 and 19 of door body 11.

In selected embodiments, reinforcing member 13 are shown being affixed to reinforcement mounting-surface sections 18 and 19 of door body 11 by means of four bolts 22. However, it should be understood that other fastener mechanisms, as understood by those having ordinary skill, will be usable without departing from the scope of the claimed invention. In particular, rivets, screws, tacks, clips, welds, and the like may be used in place of bolts 22.

In other words, reinforcement mounting-surface sections 18 and 19 of door body 11 respectively face the substantially orthogonally cut front and rear end surfaces 13a and 13b of reinforcing member 13 while sandwiching reinforcing member 13, whereby reinforcing member 13 may be positioned with high accuracy in the longitudinal B (i e., front-to-rear) direction of the vehicle.

Furthermore, shafts 22a of bolts 22 may be inserted into mounting holes 18a and 19a of reinforcement mounting-surface sections 18 and 19 so as to be fastened to opposing bolt holes 14a and 16a and 15a and 17a provided in front and rear end surfaces 13a and 13b of reinforcing member 13. Thus, reinforcing member 13 may be positioned in the width direction and the vertical direction of the vehicle.

Accordingly, four bolts 22 allow for an achievement of high mounting accuracy even with a small number of mounting positions. This allows a sealing member slidably in contact with a liftable glass member (i.e., a window glass) to be held with high accuracy by sealing-lip protrusions 23e and 23e (FIG. 3) formed on upper edge portion 23a.

Therefore, in contrast to the related art where it may be difficult to ensure the accuracy due to a large number of joint positions between panels, selected embodiments of the present disclosure allow for a smooth vertical movement of liftable glass members.

Furthermore, because bolt holes 14a, 15a, 16a, and 17a may be formed concurrently in the extrusion molding process, they may be formed readily without the need for an additional machining process.

As described above, in selected embodiments, an inner wall extending between bolt holes 14a and 16a of reinforcing member 13 may partially be provided with gaps 20, which may be formed by partially cutting out the periphery of bolt holes 14a and 16a in longitudinal direction B and may allow diametrical dimensional expansion of bolt holes 14a and 16a. Similarly, an inner wall extending between bolt holes 15a and 17a of reinforcing member 13 may partially be provided with gaps 21, which may be formed by partially cutting out the periphery of bolt holes 15a and 17a in longitudinal direction B and may allow diametrical dimensional expansion of bolt holes 15a and 17a.

Therefore, even if the fit between bolt holes 14a, 15a, 16a, and 17a and shafts 22a of bolts 22 is somewhat tight, gaps 20 and 21 may deform (in a direction to expand their gap widths) to allow bolt holes 14a, 15a, 16a, and 17a to diametrically expand. Thus, because reinforcing member 13 is not significantly deformed, the rigidity of reinforcing member 13 is maintained.

Furthermore, in selected embodiments, flange 23 includes an upper edge 23a that is cut into a shape that conforms to the contours of door body 11 and the inner trim member. Thus, flange 23 may have a shape conforming to the design of the waistline area of door body 11, thereby allowing greater flexibility for molding.

Furthermore, in selected embodiments, bolt holes 14a, 15a, 16a, and 17a may be formed through extrusion molding at the same time as the remainder of reinforcing member 13. In addition, flange 23 integrally projecting from reinforcing member 13 may also be formed at the same time as the remainder of reinforcing member 13.

After the extrusion molding process, upper edge 23a of flange 23 may be cut in accordance with the contour of door body 11 such that the upper edge 23a conforms to that contour.

Accordingly, reinforcing member 13 may be easily mounted on door body 11 by using bolts 22, whereby the rigidity of door body 11 may be improved. In addition, greater molding flexibility may be achieved especially for the waistline area of door body 11, thus enhancing external look and appearance of door body 11.

Although an exemplary embodiment of the present disclosure has been described above in detail with reference to the drawings, the claimed subject matter should not be limited to the above embodiment, and design variations and modifications are permissible to an extent that they do not depart from the scope of the disclosed subject matter.

Specifically, although the vehicle door in the above-described embodiment is directed to a front door, the disclosed subject matter should not be limited to vehicle front doors and may alternatively include rear and other doors and components of a vehicle. Thus, the vehicle door should not be limited in terms of shape, number, and material as long as the vehicle door comprises a longitudinally-extending inner door reinforcing member.

Although the reinforcing member is described as an aluminum extrusion-molded body above, it should be understood that reinforcing members in accordance with the present disclosure should not be limited to aluminum extrusion-molded bodies. Similarly, the reinforcing member may be comprise of aluminum, magnesium, beryllium, titanium, or an alloy thereof.

Further, in alternative embodiments, two, three, or five or more bolts 22 may be used to affix reinforcing member 13 to door body 11.

In selected embodiments, flange 23 may comprise upper edge 23a cut into a shape that conforms to the contour of door body 11 and the inner trim member. Specifically, after the extrusion molding process, upper edge 23a may be cut so as to be given different height dimensions h1 and h2 for portions 23b and 23c. Alternatively, flange 23 may be bent relative to an axial direction of the extrusion following the extrusion molding process so as to be given a shape that conforms to the contour of door body 11, the inner trim member, or a liftable glass (i.e., window) member.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A structure for a vehicle door, comprising:
 a reinforcing member extending along an inner side of an outer door panel in a longitudinal direction;
 wherein the reinforcing member comprises:
  an extrusion-molded body; and
  a forward end surface and a rear end surface, each comprising fixing portions configured to abut forward and rear mounts upon the inner side of the outer door panel;
  the reinforcing member configured to be secured to the mounts in the longitudinal direction.

2. The structure of claim 1, wherein the fixing portions of the reinforcing member comprise bolt holes.

3. The structure of claim 2, wherein the reinforcing member comprises a substantially ring-shaped closed cross section, wherein the bolt holes are located at a periphery of the ring-shaped closed cross section of the reinforcing member.

4. The structure of claim 3, wherein an inner wall comprising the bolt holes is partially provided with a gap extending in the longitudinal direction.

5. The structure of claim 1, wherein the reinforcing member comprises a flange projecting outward therefrom.

6. The structure of claim 5, wherein the flange comprises an upper edge cut into a shape that corresponds to a contour of the outer door panel.

7. A method to construct a vehicle door structure, comprising
- extruding a reinforcing member along a longitudinal direction;
- locating the extruded reinforcing member between mounts affixed to an inner side of an outer door panel, wherein the mounts are configured to abut fixing portions located at a forward end and a rear end of the reinforcing member;
- securing the reinforcing member to the mounts with bolts extending into bolt holes of the fixing portions; and
- contemporaneously forming the bolt holes with the extrusion of the reinforcing member.

8. The method of claim 7, further comprising providing a longitudinal gap along at least one of the bolt holes, wherein the longitudinal gap is configured to allow the bolt hole to diametrically expand when the reinforcing member is secured to the mounts.

9. The method of claim 7, further comprising forming an upper flange of the reinforcing member to correspond to a contour of the outer door panel.

10. The method of claim 7, further comprising locating the bolt holes along a periphery of a ring-shaped cross section of the extruded reinforcing member.

11. A structure for a vehicle door, comprising:
- a reinforcing means extending along an inner side of an outer door panel in a longitudinal direction of a vehicle;
- the reinforcing means comprising:
  - a body; and
  - a forward end surface and a rear end surface, each comprising a fixing means, the fixing means configured to abut forward and rear mounting means of the inner side of the outer door panel;
- the reinforcing means configured to be secured to the mounting means in the longitudinal direction.

12. The structure of claim 11, wherein the fixing means comprise bolt holes.

13. The structure of claim 12, wherein the reinforcing means comprises a substantially ring-shaped closed cross section, wherein the bolt holes are located at a periphery of the ring-shaped closed cross section.

14. The structure of claim 13, wherein an inner wall comprising the bolt holes is partially provided with a gap extending in the longitudinal direction.

15. The structure of claim 11, wherein the reinforcing means comprises a flange means projecting outward therefrom.

16. The structure of claim 15, wherein the flange means comprises an upper edge cut into a shape that corresponds to a contour of the outer door panel.

* * * * *

UNITED STATES PATENT AND TRADEMARK OFFICE
CERTIFICATE OF CORRECTION

PATENT NO.         : 7,500,712 B2
APPLICATION NO.    : 12/061371
DATED              : March 10, 2009
INVENTOR(S)        : Kenichi Hirooka et al.

It is certified that error appears in the above-identified patent and that said Letters Patent is hereby corrected as shown below:

On the Title Page Item (56), References Cited, Foreign Patent Documents, in addition to the references cited, please add --JP 5-116537 05/1993--.

On the Title Page Item (56), References Cited, Foreign Patent Documents, in addition to the references cited, please add --JP 6-78036 11/1994--.

On the Title Page Item (56), References Cited, Other Publications, in addition to the reference cited, please add --Industrial Property Digital Library – Abstract of Japan publication number 06078036, published November 1, 1994 (1 page)--.

On the Title Page Item (56), References Cited, Other Publications, in addition to the reference cited, please add --Espacenet – Abstract of Japan publication number 5116537, published May 14, 1993 (2 pages)--.

Signed and Sealed this

Twenty-eighth Day of April, 2009

JOHN DOLL
*Acting Director of the United States Patent and Trademark Office*